(12) United States Patent
Xu et al.

(10) Patent No.: US 11,544,595 B2
(45) Date of Patent: Jan. 3, 2023

(54) INTEGRATED GLMIX AND NON-LINEAR OPTIMIZATION ARCHITECTURES

(71) Applicant: Microsoft Technology Licensing, LLC, Redmond, WA (US)

(72) Inventors: Dan Xu, San Ramon, CA (US); Chunzhe Zhang, Sunnyvale, CA (US); Qing Li, Fremont, CA (US); Jiuling Wang, Union City, CA (US); Kunal Mukesh Cholera, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 418 days.

(21) Appl. No.: 16/834,681

(22) Filed: Mar. 30, 2020

(65) Prior Publication Data

US 2021/0304029 A1    Sep. 30, 2021

(51) Int. Cl.
| | | |
|---|---|---|
| *G06N 20/00* | (2019.01) | |
| *G06N 5/04* | (2006.01) | |
| *G06Q 50/00* | (2012.01) | |
| *G06Q 10/10* | (2012.01) | |

(52) U.S. Cl.
CPC ............. *G06N 5/04* (2013.01); *G06N 20/00* (2019.01); *G06Q 10/105* (2013.01); *G06Q 50/01* (2013.01); *G06Q 10/107* (2013.01)

(58) Field of Classification Search
CPC .......... G06N 5/04; G06N 5/022; G06N 7/005; G06N 20/00; G06Q 10/105; G06Q 10/107; G06Q 10/06311; G06Q 50/01; G06Q 30/0203; A63F 13/215; A63F 13/358; G06F 16/9024; G06F 16/9535; H04L 51/52
See application file for complete search history.

(56) References Cited

U.S. PATENT DOCUMENTS

| | | | |
|---|---|---|---|
| 2013/0204664 A1* | 8/2013 | Romagnolo | G06Q 30/0203 705/7.32 |
| 2017/0317964 A1* | 11/2017 | Chen | H04L 51/52 |
| 2018/0253985 A1* | 9/2018 | Aggarwal | G06N 20/00 |
| 2019/0042988 A1* | 2/2019 | Brown | G06N 5/022 |
| 2019/0303835 A1* | 10/2019 | Saha | G06Q 10/06311 |

(Continued)

OTHER PUBLICATIONS

Agarwal, et al., "Constrained Optimization for Homepage Relevance", In Proceedings of the 24th International Conference on World Wide Web, May 18, 2015, pp. 375-384.

(Continued)

*Primary Examiner* — Le H Luu
(74) *Attorney, Agent, or Firm* — Schwegman Lundberg & Woessner, P.A.

(57) ABSTRACT

In an example embodiment, a machine learned model that integrates a generalized linear mixed model (GLMix) non-linear optimization is utilized to jointly perform personalized communications targeting and volume control. The machine learned model may be trained to not only maximize user engagement with a notification generally, such as maximizing the total number of people who view, save, or apply for a job associated with a job listing in the communication, but also trained to maximize an end goal of the notification, such as the total number of people who apply for the job associated with a job listing in the communication.

20 Claims, 7 Drawing Sheets

(56) References Cited

U.S. PATENT DOCUMENTS

| | | | | |
|---|---|---|---|---|
| 2020/0004827 A1* | 1/2020 | Salomatin | ........... | G06F 16/9535 |
| 2020/0129851 A1* | 4/2020 | Sardari | ................ | A63F 13/215 |
| 2020/0306632 A1* | 10/2020 | Kolen | ................... | A63F 13/358 |
| 2020/0311568 A1* | 10/2020 | Xue | .................... | G06F 16/9024 |
| 2021/0065032 A1* | 3/2021 | Moghaddam | ........... | H04L 51/52 |

OTHER PUBLICATIONS

Agarwal, et al., "Personalized Click Shaping through Lagrangian Duality for Online Recommendation", In Proceedings of the 35th international ACM SIGIR Conference on Research and Development in Information Retrieval, Aug. 12, 2012, pp. 485-494.

Bao, et al., "From Prediction to Action: Improving User Experience With Data-Driven Resource Allocation", In IEEE Journal on Selected Areas in Communications, vol. 35, Issue 5, May 2017, pp. 1062-1075.

Gao, et al., "Near Real-time Optimization of Activity-based Notifications", In Proceedings of the 24th ACM SIGKDD International Conference on Knowledge Discovery & Data Mining, Aug. 19, 2018, pp. 283-292.

Gupta, et al., "Email Volume Optimization at LinkedIn", In Proceedings of the 22nd ACM SIGKDD International Conference on Knowledge Discovery and Data Mining, Aug. 13, 2016, pp. 97-106.

* cited by examiner

INTEGRATED GLMIX AND NON-LINEAR OPTIMIZATION ARCHITECTURES

TECHNICAL FIELD

The present disclosure generally relates to technical problems encountered in sending electronic communications in computer networks. More specifically, the present disclosure relates to the use of integrated Generalized Linear Mixed Models (GLMix) and Non-Linear Optimization architectures used to determine which types of electronic communications to send to optimize communication effectiveness.

BACKGROUND

The rise of the Internet has occasioned two disparate yet related phenomena: the increase in the presence of social networking services, with their corresponding user profiles visible to large numbers of people, and the increase in the use of these social networking services to provide content. An example of such content is a social media post, where a user can post information, such as text, pictures, videos, articles, etc. for other users to view.

Social networking services act to ensure that user engagement, meaning the amount of time and effort a user spends engaging with the social networking service, is high. Examples of such user engagement include browsing user profiles, looking through job listings, sending communications to other users of the social networking service, performing searches, clicking on feed items, etc.

Social networking services often attempt to target various communication to users to encourage engagement. Such targeted communications may include, for example, notifications about jobs a user may be interested in, notifications about published articles relevant to a job or interest the user has, notifications about friends or colleagues of the user, etc. Not only is there a range of types of such notifications that the social networking service can send, there also is a range of different communications channels that these notifications could be sent via. Examples of channels include email communications, push communications (e.g., via an installed mobile device application), text notifications, etc. Furthermore, the volume of such communications is also a factor that can be adjusted by the social networking services. Thus there are various combinations of types of notifications, channels, and volume that a social networking service can choose from.

Proper targeting of these combinations of communications types, channels, and volume can result in increased user engagement. A user, for example, who is presented with relevant information at a time and through a mechanism that the user finds convenient and acceptable views that information positively. Improper targeting, however, can result in reduced user engagement. A user, for example, who is presented with irrelevant information or views the notifications as inconvenient or even bothersome (either due to the channel used or the volume used or both) may be turned off by the social networking service.

Thus, what is needed is a mechanism to optimize the determination of which combination is appropriate for users.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
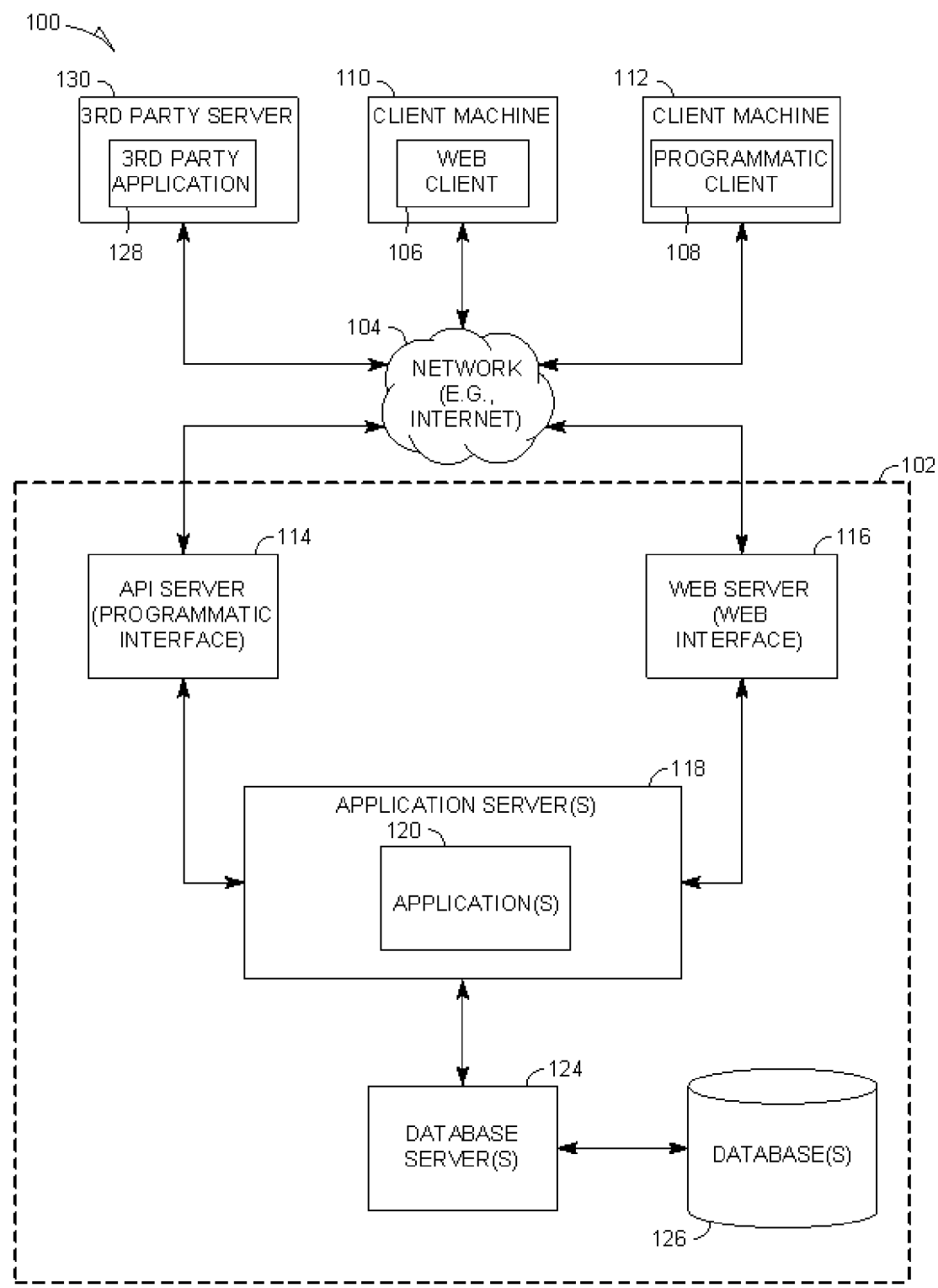
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a machine learned model that integrates a generalized linear mixed model (GLMix) non-linear optimization is utilized to jointly perform personalized communications targeting and volume control. The machine learned model may be trained to not only maximize user engagement with a notification generally, such as maximizing the total number of people who view, save, or apply for a job associated with a job listing in the communication, but also trained to maximize an end goal of the notification, such as the total number of people who apply for the job associated with a job listing in the communication.

The objective function of the non-linear optimization may be based on the outputs of a GLMix model, and the constraints of the non-linear optimization may be based on outputs of the logistic regression model. The result is a machine learned model which aims to increase user engagement through targeting the most relevant combination of communication channel and volume based on user characteristics and activity, while controlling user complaints and unsubscribe actions to a reasonable level.

In an example embodiment, there are four components that, when utilized together, provide the solution described above. The first component is a GLMix model that personalizes the communication targeting by predicting future user engagement. The second component is a logistic regression model used to predict negative reactions for each combination of communication type and channel. These negative reactions can include reactions such as complaining or discontinuing a subscription (unsubscribing).

The third component utilizes convex and non-convex optimization tasks to achieve joint personalized channel targeting and volume control. The fourth component is an engineering architecture able to implement the other components.

Description

While the proposed methodology may be utilized for a number of different types of communications, in an example embodiment it is applied specifically to the case of job suggestions. For ease of discussion, the job suggestion embodiment will be described throughout this document, but the claims shall not be interpreted as limiting the scope of protection to job suggestions unless explicitly recited.

While there have been no published models specifically addressing the issue of predicting both communications channel and volume for a given communication type, historically, models to rank various types of communications to potentially send to users have utilized generalized linear models (GLMs). A GLM is a generalization of linear regression that allows for response variables that have error distribution models other than a normal distribution. The GLM generalizes linear regression by allowing the linear model to be related to the response variable via a link function and by allowing the magnitude of the variance of each measurement to be a function of its predicted value. GLMs may utilize the following prediction formula: $g(E[y_{ij}])=x_{ij}'w$, where this formula predicts the response of user i to communication item j, and $x_{ij}$ is a feature vector, w is a coefficient vector, $E[y_{ij}]$ is an expectation of response, and go is a link function.

However, in scenarios where data is abundant, having a finer-grained model at the user or item level would potentially lead to more accurate prediction, because the user's personal preferences on items and the item's specific attraction for users could be better captured. GLM alone cannot provide personalization.

Thus, in an example embodiment, a GLMix model is used to personalize communications targeting by predicting future user engagement given their characteristics, recent activities, and engagement with prior targeted communications. As described above, this personalization attempts to achieve two different goals. The first is promoting job-related actions, such as trying to maximize the total number of job views, saves, and applies. The second is promoting job applications, such as trying to turn each job seeker into a job applicant (i.e., maximizing the total number of job applicants). These two goals are different, but related.

In machine learning, features are values of data used to both train a machine learned model and to evaluate the machine learned model against a particular item/user. In an example embodiment, the features utilized include user feature data and volume data. The user feature data may include information from a user's profile, such as profile completeness (what percentage of a user's profile has been completed), industry, country, education, skills, location, etc., user engagement (e.g., the number of times the user has engaged with the social networking system, or one specific portion of the social networking system such as a jobs portion and/or careers portion, within a particular period, such as the last month) as well as the various types of the engagement (views, clicks, applies, etc.).

The volume data may include, for each type of communication/channel and each user, how many communications were sent over a given time period (e.g., week). For training purposes, response data is also used as one or more features, for example how many job actions a user performs, or whether a user becomes a job applicant.

Specifically, consider i as a communication type/channel index and j' as a user index. For the business of promoting job-related actions, let $y_j'$ represent the number of future job actions from user j' during a desired future time window (e.g., 1 week). For the goal of promoting number of job applicants, consider)); as an indicator of whether a user becomes a job applicant. Let $x_{j'i}$ denote i's number of sends to user j' in the current time window, e.g., one week. In an example embodiment, a GLMix model is developed to predict a user's future job-related actions or whether a user becomes a job applicant, given each campaign's number of sends in a current time window together with user features, indexed by k.

In an example embodiment, the majority of user features are categorical, for example, country, industry, etc. However, some engagement features are not categorical. These continuous features may be categorized. In general, considering a user feature k, we $\gamma_k$, ranging as 1, ... $I_k'$ to index its value categories. The value of a category $\gamma_k$ is denoted by $v_{\gamma k}$. Thus, users are divided into different user groups. Users within the same group share the same value for all user features. j may later be used to index a user group.

A GLMix model is formulated to link the above user features, each combination of communication type and channel's number of sends in current time window with user's future response:

$$g(E(y_j')) = \theta_0 + \sum_{k=1}^{K} \theta_{\gamma k 0} + \sum_{i=1}^{M}\left(\theta_i + \sum_{k=1}^{K} \theta_{\gamma k i}\right)x_{j'i}$$

where θs are coefficients to be estimated from data, g(*) is the link function of a generalized linear model and $\gamma_k$ is a user feature value index. Thus, the coefficients of volume can be divided into two parts, where $\theta_i$ represents the mean effect of sending campaign i while $\Sigma \theta_{\gamma_k i}$ captures the effect unique to user group.

$$\text{Let } f(x, \theta) = \theta_0 + \sum_{k=1}^{K} \theta_{\gamma k 0} + \sum_{i=1}^{M}\left(\theta_i + \sum_{k=1}^{K} \theta_{\gamma k i}\right)x_{j'i}$$

In order to promote the number of job-related actions, g(*) will be specified as Poisson link since in this case response $y_j'$ is a count denoting the number of job-related actions of user j'. In order to promote the number of job applicants, g(*) will be specified as a logistic link since response g is a 0/1 binary variable denoting whether user j' becomes a job applicant.

Poisson Link $$y_j' \sim \frac{\lambda^n e^{-\lambda}}{n!}, \log(\lambda) = f(x, \theta)$$

Logistic Link $$\log\frac{p(y_{j'} = 1)}{1 - p(y_{j'} = 1)} = f(x, \theta)$$

Through training data, the coefficients in the above model may be estimated. The fitted models could predict future job actions and job applicants for a given number of sends.

Let $\theta_j$ represent the vector of all coefficients in the above GLMix models and let $x_j$ represent the vector of all corresponding email volume variables in the above GLMix models. j is the user group index, j=1, ..., J.

Given the fitted model, the predicted total job actions would be:

$$\sum_{j=1}^{J} n_j \exp(\theta_j^T x_j)$$

The predicted total job applicants would be:

$$\sum_{j=1}^{J} \frac{n_j}{1+\exp(-\theta_j^T x_j)}$$

where $n_1$ is the number of users in the user group j. These two predicted numbers will be used as the objective function for achieving the two goals by the third component, respectively, described in more detail below.

More actions/applicants will be predicted by the GLMix models above if more communications are sent, as the GLMix models are positive. Thus, the second component, described below, develops a negative prediction model to predict a number of negative responses for a given number of sends. The third component will combine the personalization part (positive GLMix models) and the negative prediction model to jointly perform personalization and volume control.

In the second component, the probability of negative action is considered for each type of communication/channel and each user group. In this example embodiment, a complaint is considered as the negative action being measured. This complaint may be determined explicitly, with the user sending some sort of complaint communication to the social networking service (e.g., an email saying "I don't like all of these emails I have been receiving," or selecting an "unsubscribe" link in an email). The compliant probability of a type of communication/channel closely depends on the user features. Intuitively, if the user is an active job seeker, he or she is less likely to complain in response to receiving job-listing-related communications. If a user received too many communications/channels in the past periods, he or she is more likely to complain. For the complaint response model, each type of communication may be considered separately, since a user may complain, for example, about only one specific type of email and not about all emails.

The input features may include user feature data, such as information from a user's profile, such as profile completeness (what percentage of a user's profile has been completed), industry, country, education, skills, location, etc., user engagement (e.g., the number of times the user has engaged with the social networking system, or one specific portion of the social networking system such as a jobs portion and/or careers portion, within a particular period, such as the last month) as well as the various types of the engagement (views, clicks, applies, etc.).

The input features (for training) may then also include user complaint data, which includes data about whether the user explicitly complained about a particular communication. It should be noted that in some example embodiments, the user is provided the opportunity to complain about particular types of emails or complain more generally. For example, two unsubscribe links may be provided in a communication sent to a user: the first being to unsubscribe to emails of this type, and the other to be unsubscribe to all emails. In such instances, both types of complaints may be considered by the model.

In an example embodiment, the second component utilizes logistic regression to model the relation between user features and user complaint response for each type of communication/channel. Specifically, recall user features indexed by k, k=1, ..., K. Let $v_k$ be a value of the kth user feature. Let a 0/1 binary variable $y_i^c$ indicate whether a user complains about campaign type i or not. The formula is then:

$$\log \frac{p(y_i^c = 1)}{1 - p(y_i^c = 1)} = \beta_0 + \sum_{k=1}^{K} \beta_k V_k.$$

Users in a user group j have the same user feature values for every user feature k. A user feature index function $I_{jy_k}$ may equal 1 if a user group j has a user feature value indexed by $y_k$ for user feature k, ranging from 1, ... $\Gamma_k$, and 0 otherwise. Thus, a user group j takes a value of user feature k of $$\Sigma_{y_k=1}^{\Gamma_k} v_{y_k} I_{jy_k}$$

The complaint probability for a communication/channel type i for user group j is $$p_{ji}^c = \frac{1}{1+e^{-\beta_0 - \Sigma_{k=1}^{K} \beta_k \Sigma_{y_k=1}^{\Gamma_k} v_{y_k} I_{jy_k}}}$$

Based on the complaint probability for each type of campaign and each user group, the second component is able to calculate the overall user complaints for all the campaigns, based on the control variable, i.e., the campaign-sending volume to each user for each type of campaign given a time window. The user complaints, however, need to be constrained. Specifically, for the overall careers campaigns, the constraint is $$\sum_j n_j \sum_{i=1}^{M} p_{ji}^c x_{ji} \leq \eta^{cc}.$$

where $n_1$ is the population count of user group j, $x_{ji}$ is the volume of campaign type i that is sent to a user in user group j. $\eta^{cc}$ is the complaint constraint for overall campaigns.

The above constraint does not guarantee a type of campaign has a desirable user complaint level; thus, one can also consider the complaining constraint for a type of communication type/channel i as $$\sum_j n_j p_{ji}^c x_{ji} \leq \eta_i^e.$$

Since the above two constraints do not guarantee a user group j has a desirable complaint level, one can further consider the following local constraint for user group j.

$$n_j p_{ji}^c x_{ji} \leq \eta_{ji}^l$$

With the above user complaint constraints considered, users' personal preferences are respected by considering user features in training the campaign complaint response, which avoids or reduces the risk of overwhelming user complaints and the resultant bad user experiences.

The third component performs convex and non-convex optimization tasks to achieve joint personalized communication/channel targeting and volume control.

For the goal of promoting job related actions, communication/channel volume optimization is used to maximize the total expected number of job-related actions, with the complaint probability constraints. The problem can be formulated by the following optimization model:

$$\max_X \sum_{j=1}^{J} n_j \exp(\theta_j^T x_j), \min_X - \sum_{j=1}^{J} n_j \exp(\theta_j^T x_j)$$

$$\text{s.t.} \sum_{j=1}^{J} n_j \sum_{i=1}^{M} p_{ji}^c x_{ji} \leq \eta^{cc},$$

$$\sum_{j=1}^{J} n_j p_{ji}^c x_{ji} \leq \eta_i^e,$$

$$n_j p_{ji}^c x_{ji} \leq \eta_{ji}^l,$$

$$x_j \geq \eta^b,$$

$$j = 1, 2, \ldots, J; i = 1, 2, \ldots, M,$$

Here $x_j$ is the control variable which denotes the sending volume vector of different types of communications/channels for user group j given a time window, e.g., one week. The last constraint enforces a baseline sending amount, i.e., $\eta_b$, a vector for each type of communication/channel. An element of $\eta_b$ can be 0, i.e., no requirement on the minimum email amount, or a positive number such as 1, i.e., sending at least 1 email given a time window.

The above is a convex optimization problem due to the fact that the objective function sums over the exp( ) function and all constraints are linear. It can be solved efficiently by standard convex optimization solvers such as by interior point method.

For the goal of promoting job applicants, communication/channel volume optimization is used to maximize total expected number of applicants, with the complaint probability constraints. The problem can be formulated by the following optimization model:

$$\max_X \sum_{j=1}^{J} \frac{n_j}{1 + \exp(-\theta_j^T x_j)}, \text{ or } \min_X \sum_{j=1}^{J} \frac{n_j \exp(-\theta_j^T x_j)}{1 + \exp(-\theta_j^T x_j)}$$

$$\text{s.t.} \sum_{j=1}^{J} n_j \sum_{i=1}^{M} p_{ji}^c x_{ji} \leq \eta^{cc},$$

$$\sum_{j=1}^{J} n_j p_{ji}^c x_{ji} \leq \eta_i^e,$$

$$n_j p_{ji}^c x_{ji} \leq \eta_{ji}^l,$$

$$x_j \geq \eta^b,$$

$$j = 1, 2, \ldots, J; i = 1, 2, \ldots, M.$$

This is a non-convex optimization model, since the objective function is non-convex, which can be difficult to solve and may not have a unique optimal solution. In an example embodiment, a standard sub-gradient based approach may be leveraged to find a near optimal solution for this model. First, the optimization model above may be converted to the dual problem:

$$(D-0)\max_{\mu,\nu} \sum_{j=1}^{J} f(x_j) - \mu \eta^{cc} - \sum_{i=1}^{M} v_i \eta_i^e$$

$$\text{s.t.} \quad \mu \geq 0, \; v \geq 0,$$

where for each user group j, the following is true:

$$(D-j)f(x_j) = \min_{x_j} \frac{n_j \exp(-\theta_j^T x_j)}{1 + \exp(-\theta_j^T x_j)} + n_j \sum_{i=1}^{M} (\mu + v_i) p_{ji}^c x_{ji}$$

$$\text{s.t.} \quad n_j p_{ji}^c x_{ji} \leq \eta_{ji}^l,$$

$$x_j \geq \eta^b,$$

$$i = 1, 2, \ldots, M.$$

To find a solution to the original problem, a solution to the dual problem may first be achieved. The dual optimal value serves as a lower bound of the optimal value for the primary problem. The dual problem may be solved by a standardized subgradient-based algorithm, using the Lagrangian multiplier μ by:

$$\mu^{t+1} = \left[\mu^t + \frac{1}{t}\left(\sum_{j=1}^{J} n_j \sum_{i=1}^{M} p_{ji}^c x_{ji}^{t*} - \eta^{cc}\right)\right]^+, \text{ and } v_i, \forall i \text{ by}$$

$$v_i^{t+1} = \left[v_i^t + \frac{1}{t}\left(\sum_{j=1}^{J} n_j p_{ji}^c x_{ji}^{t*} - \eta_i^e\right)\right]^+,$$

where t denotes the tth iteration of updating μ and $v_i$, $x_j^{t*}=(x_{ji}^{t*}, i=1, M)$ is the optimal solution to D-j given $\mu=\mu^t$, and $v_i=v_i^t$ in the tth iteration.

The question then moves to how to find the optimal solution for D-j for the tth iteration. D-j is a nonconvex optimization problem. The Lagrangian function for D-j may be written and Karush-Kuhn-Tucker (KKT) conditions may be explored. Note that the constraints are all linear; KKT conditions are used for any local or global optimization solutions. The idea here is to use a KKT condition to search for the candidate optimal solutions.

The formula of KKT conditions is omitted here for simplicity. A communication channel importance coefficient may be defined as $$X_{ji} = \frac{\theta_{ji}}{(\mu + v_i) p_{ji}^c},$$

i=1, M for user group j, and the communication channel types may be sorted according to $X_{ji}$. Consider a communication channel type i', for which one has $1/X_{ji'-1} > e^{-\theta_j^T x_j^*}/(1+e^{-\theta_j^T x_j^*})^2 \geq 1/X_{ji'}$. By KKT conditions, it can be established that $$x_j^* = \left(\eta_1^b, \eta_2^b, \ldots, \eta_{i'-1}^b, x_{ji'}^*, \frac{\eta_{ji'+1}^l}{n_j p_{ji'+1}^c}, \ldots, \frac{\eta_{jM}^l}{n_j p_{jM}^c}\right),$$

where $x_{ji'}^*$ is equal to $$\min\left(-\frac{1}{\theta_{ji'}}\ln\left(\frac{X_{ji'}}{2} - \frac{\sqrt{X_{ji'}^2 - 4X_{ji'}}}{2} - 1\right) + d, \frac{\eta_{ji'}^l}{n_j p_{ji'}^c}\right) \text{ where}$$

$$d = \frac{\theta_{j0}}{\theta_{ji'}} + \sum_{i=1}^{i'-1} \frac{\theta_{ji}}{\theta_{ji'}}\eta_i^b + \sum_{i=i'+1}^{M} \frac{\theta_{ji}\eta_{ji}^l}{\theta_{ji'}n_j p_{ji}^c}.$$

Based on the structure and properties of $$x_j^* = \left(\eta_1^b, \eta_2^b, \ldots, \eta_{i'-1}^b, x_{ji'}^*, \frac{\eta_{ji'+1}^l}{n_j p_{ji'+1}^c}, \ldots, \frac{\eta_{jM}^l}{n_j p_{jM}^c}\right),$$

one can search feasible and optimal solutions of $x_j$ for the problem D-j given the current μ by checking from the index 1 to index M Thus, the time complexity of finding $x_j^*$ for D-j is O(M). Note that for some user group j, there might be more than one solution.

After D-0 converges, the two constraints in the original problem may not be satisfied by the optimal solutions to D-j. So one needs to find a feasible solution for the primary problem based on an optimal solution to D-j.

For those user groups that have a unique solution to D-j under the optimal Lagrange multipliers, i.e., Lagrange multipliers when D-0 converges, it can be shown that those user groups with a unique solution to D-j do not violate the two constraints of the original problem. After those user groups take their unique solutions, the constraints of the original problem can be updated by $$\eta_r^{cc} = \eta^{cc} - \sum_{j=1}^{J_u} n_j \sum_{i=1}^{M} p_{ji}^c x_{ji}^*$$

$$\eta_{ir}^c = \eta_i^c - \sum_{j=1}^{J_u} n_j p_{ji}^c x_{ji}^*$$

$\eta_r^{cc}$ and $\eta_{ir}^c$ are the remaining constraint budgets. j=1 . . . $J_u$ denotes the user group which has one unique optimal solution when D-0 converges.

Next, the remaining budgets of the two constraints may be assigned to each user group j with more than one optimal solution one by one, with the remaining budgets of the constraints being updated after assigning the budgets to the solutions. Mathematically, for each remaining user group j, the following problem may be solved:

$$f(x_i) = \min_{x_j} \frac{n_j \exp(-\theta_j^T xj)}{1 + \exp(-\theta_j^T xj)} + n_j \sum_{i=1}^{M}(\mu + v_i)p_{ji}^c x_{ji}$$

s.t. $n_j p_{ji}^c x_{ji} \leq \eta_{ji}^l,$ $x_j \geq \eta^b,$ $$n_j \sum_{i=1}^{M} p_{ji}^c x_{ji}^* \leq \eta_r^{cc}$$

$$n_j p_{ji}^c x_{ji}^* \leq \eta_{ir}^c \quad i = 1, 2, \ldots, M.$$

After solving this, the remaining budgets of $\eta_r^{cc}$ and $\eta_{ir}^c$ can be updated by $$\eta_r^{cc} = \eta_r^{cc} - n_j \sum_{i=1}^{M} p_{ji}^c x_{ji}^*$$

$$\eta_{ir}^c = \eta_{ir}^c - n_j p_{ji}^c x_{ji}^*$$

These formulas keep updating until the budget becomes 0 or all the user groups get their solution.

Thus, the algorithm for finding the non-convex solution is as follows. The original problem is first converted to a Lagrange dual problem, which may be termed problem 1 and problem 2. Problem 1 may be solved by a subgradient-based approach where Lagrange multipliers are updated in iterations. In each iteration, the optimal solutions to problem 2 may be searched for using KKT conditions. After the original problem converges, those user groups that have unique solutions to D-J under the optimal Lagrange multipliers take their unique solution. The remaining budgets of the constraints are then applied to each user group j with more than one optimal solution one by one, with the remaining budgets of the constraints being updated after assigning.

The fourth component provides the architecture to implement the first three components, which will be described in more detail below.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
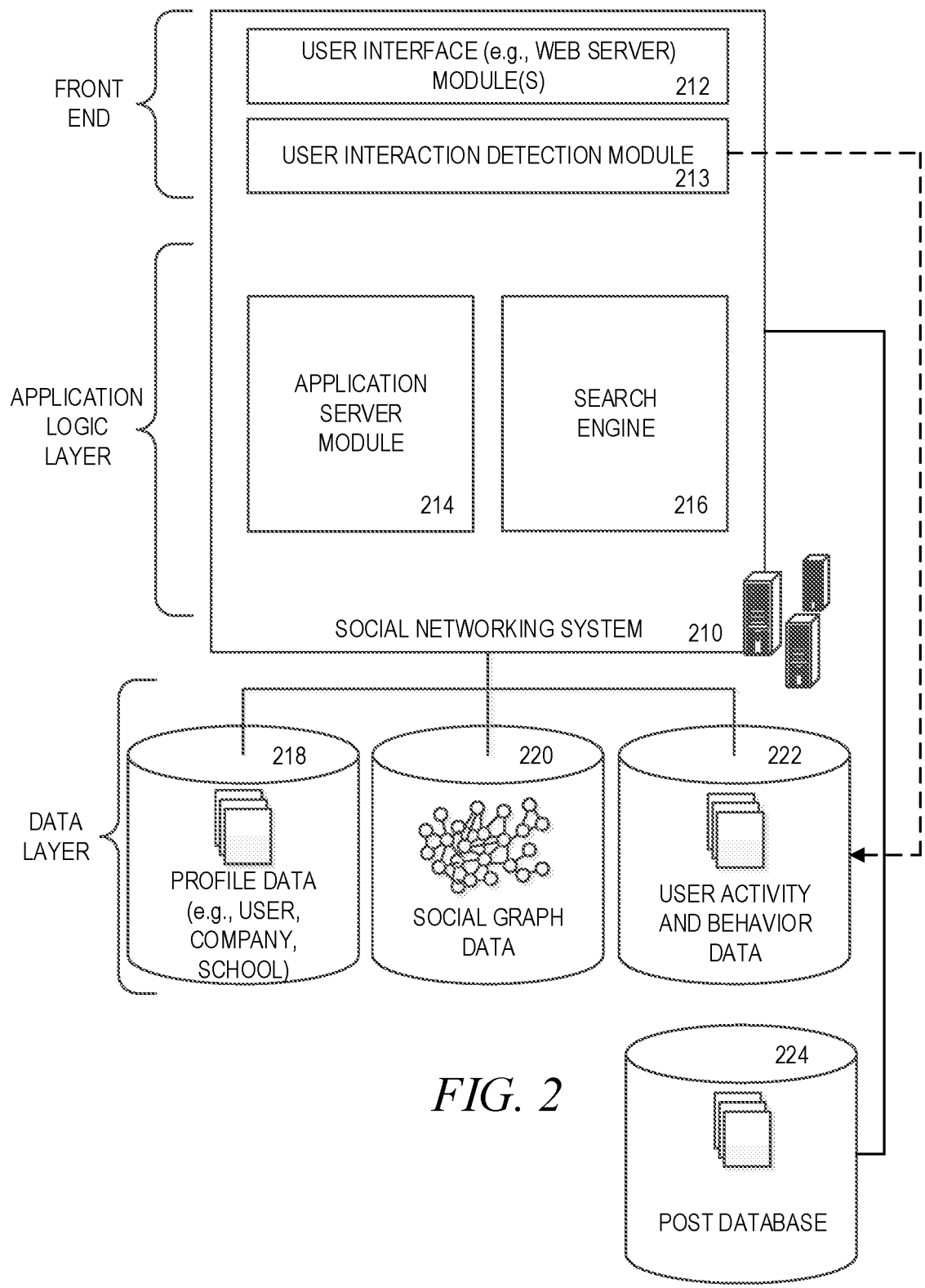
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

As described above, embodiments of the present invention may be utilized for ranking and/or selection of social media posts to display to users. These social media posts may be directly or indirectly generated from user activity within the social networking service, and may be stored in post database 224. Examples of social media posts directly generated from user activity include the users themselves posting text, image, or video information as a post. Examples of social media posts indirectly generated from user activity include the social networking service itself generating the post when the user has a change in their profile, or when the user is mentioned in an article, etc.

Figure 3:
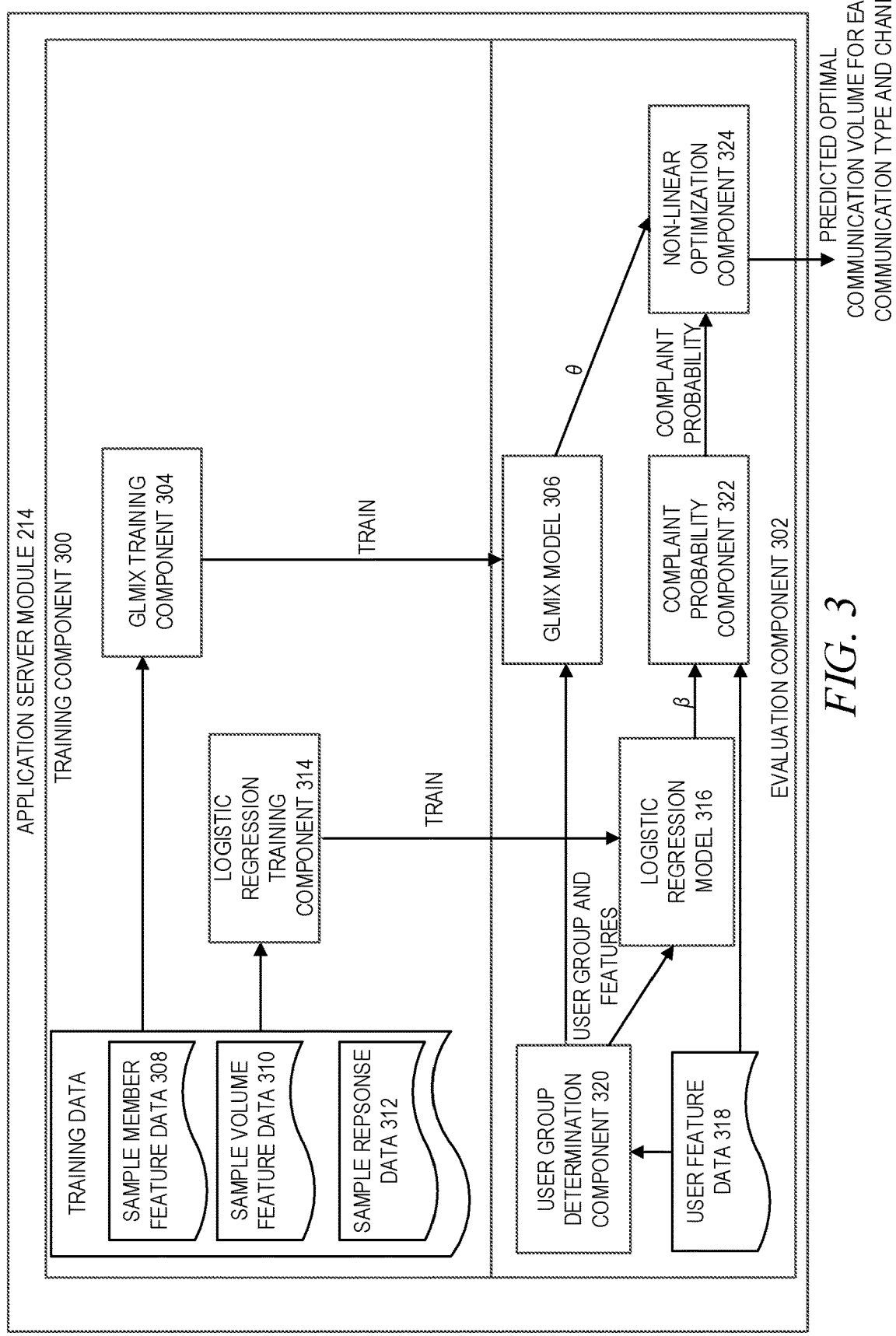
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

Specifically, the application server module 214 can be divided generally into a training component 300 and an evaluation component 302. The training component 300, as will be described, uses various features and machine learning algorithms to train multiple machine learned models. The outputs of these machine learned models are (potentially different) coefficients for each user feature. The evaluation component 302 then uses these coefficients to make runtime decisions as to which communication type/channel/volume combination to use to send communications to a particular user.

Looking first at the training component 300, a GLMix training component 304 may train a GLMix model 306 using sample user feature data 308, sample volume feature data 310, and sample response data 312. It should be noted that the sample user feature data 308, sample volume feature data 310, and sample response data 312 may be collected for (potentially different) windows of time. As an example, sample user feature data 308 may include data from the last month, whereas sample volume feature data 310 and sample response data 312 may include data from just one week. It should be noted that in an example embodiment the week's worth of data used for the sample volume feature data 310 immediately precedes the week's worth of data used for the sample response data 312, which allows the sample response data 312 to be used as a measure of effectiveness of the communications sent based on the sample volume feature data. Thus, for example, if the sample volume feature data 310 is from January 1-7, then the sample response data 312 may be from January 8-14. During the training process, the GLMix training component 304 utilizes user feature data to model random effect coefficients. This means that the coefficients (i.e., weights) for the random effects portion of the GLMix model 306 are learned automatically during this training process.

The sample volume feature data 310 may also be used by a logistic regression training component 314 to train a logistic regression model 316 using a logistic regression machine learning algorithm. The logistic regression training component 304 may also utilize sample negative response data from the sample response data 312, such as complaint data, as part of this training process.

For any given user input, the user's feature data 318 may be used by a user group determination component 320 to determine a user group for the given user input. This determined user group may then be passed along with features corresponding to the user group to the GLMix model 306, which outputs a coefficient θ. Similarly, a coefficient β may be output from the logistic regression model 316. As will be seen, these coefficients are utilized by the evaluation component 302.

Specifically, the evaluation component 302 contains a complaint probability component 322, which takes as input the coefficient β for each feature of a particular user as well as user feature data 318. The user feature data 318 is used to classify users into a corresponding user group and then calculate a complaint probability for the particular user. This complaint probability is then used as input to a non-linear optimization component 324, which also utilizes the coefficient θ for the user group and features. The output of the non-linear optimization component 324 is a predicted optimal communication volume for each combination of communication type and channel.

In one example embodiment, the data collection and training of the GLMix models and logistic regression model, as well as the evaluation using the evaluation component 302, can be performed in fairly large intervals, for example every two months. Based on this optimization, a determination can be made as to how many communications of each type of communication/channel combination should be sent for each user over a particular time period (e.g., a week).

However, in some embodiments, targeting may be run every day. In such embodiments, it becomes necessary to translate the optimal communication volume to a daily communication decision. In one approach, the optimal number of communications is distributed evenly instead of sending all communications for a given combination in a single day. For example, if the determination is that a user should receive no more than seven push notifications about jobs per week, it may be better to send one push notification per day rather than sending out seven push notifications in a single day and then none the next six days. Tracking this sort of even distribution, however, can be difficult if the determination is made daily, and also gets even more complex if the determination is not easily divisible into the number of days in the time period. For example if it is determined that only 5 communications should be sent to a user per week, the question then arises of which 5 days would be chosen for communications to be sent.

In an example embodiment, a probability-based approach is used, where each day a probability of the determined volume of communications divided by the total number of days in the time period is used to determine whether a communication will be sent on a given day. Thus, in the above example, rather than choosing, for example, that the 5 communications will be sent out as once-a-day communications during each work day and no communications on weekends, the system will alternatively determine on each day whether to send a communication based on a probability of 5/7, meaning a 71.42% chance daily.

Furthermore, in some example embodiments a user may be reclassified (potentially into a different user group) on a daily basis, based on his or her recent activities.

Figure 4:
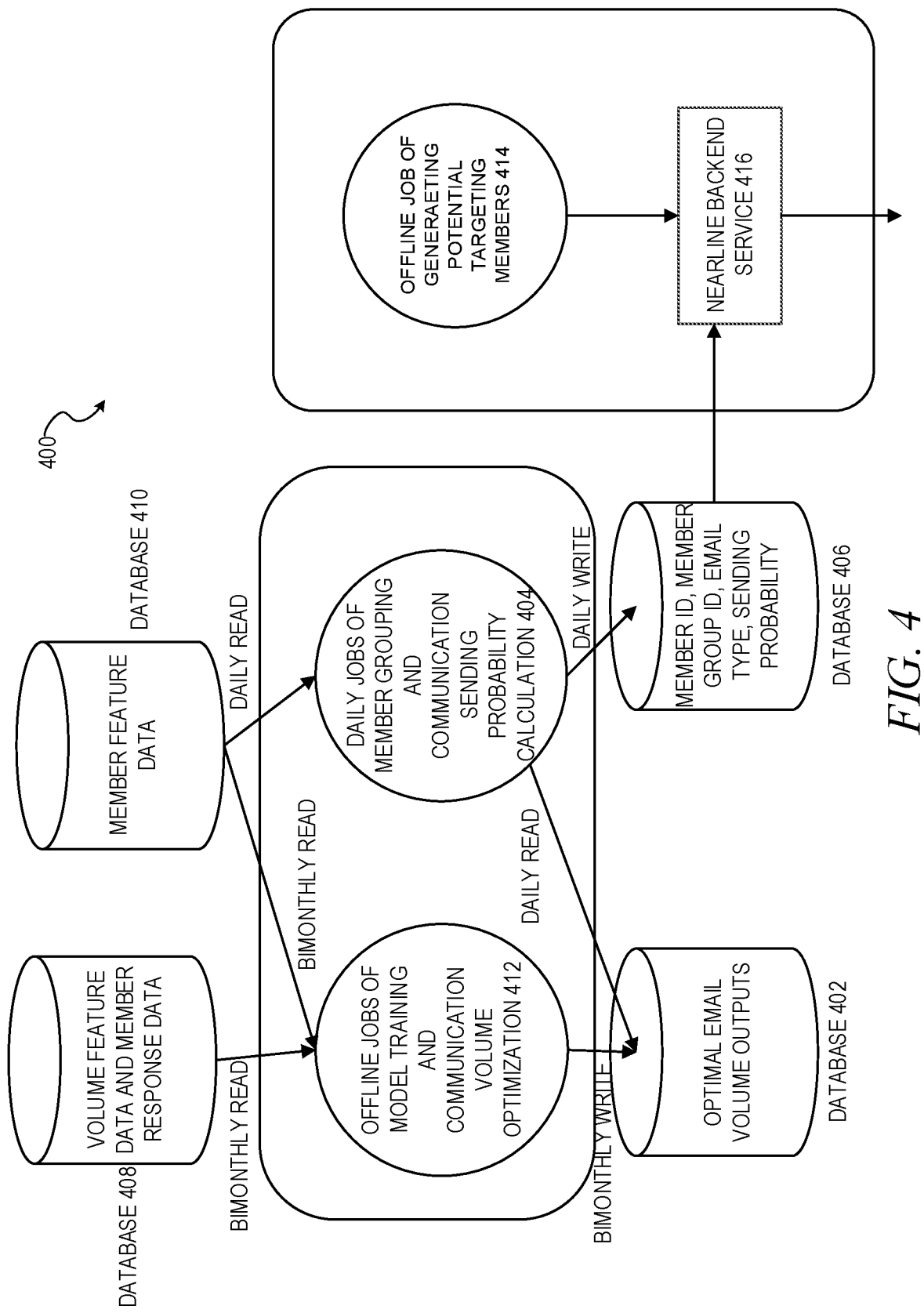
FIG. 4 is a diagram illustrating a flow of offline and nearline jobs for personalized communication targeting and volume optimization in accordance with an example embodiment.

FIG. 4 is a diagram illustrating a flow of offline and nearline jobs for personalized communication targeting and volume optimization in accordance with an example embodiment. Nearline is a term for an intermediate type of storage/operation between offline and online. Nearline storage, for example, is not immediately available, but can be made quickly available without human intervention. In this example embodiment, offline jobs of model training and communication volume optimization 400 are performed bi-monthly and written to database 402, which stores optimal email volume outputs. Jobs of user grouping and communication sending probability calculations 404 are performed daily by reading data from database 402 and then writing the calculations, including user ID, user group ID, communication type, and daily sending probability to database 406.

The offline jobs of model training and communication volume optimization 412 may utilize volume feature data and user response data from database 408 as well as user feature data from database 410, whereas the jobs of user grouping and communication sending probability calculations 404 may utilize just the user feature data.

Then an offline job 414 (e.g., a Hadoop job) may be scheduled daily to push all the potential targeting users (e.g., all those who created a job alert for a particular job alert channel, all those who viewed a job in the past week, etc.) and the basic communication type/channel data to a nearline backend service 416. This nearline backend service 416 fetches the communication sending probability information for each user and, based on this, decides whether to send or drop a potential communication for each user.

Figure 5:
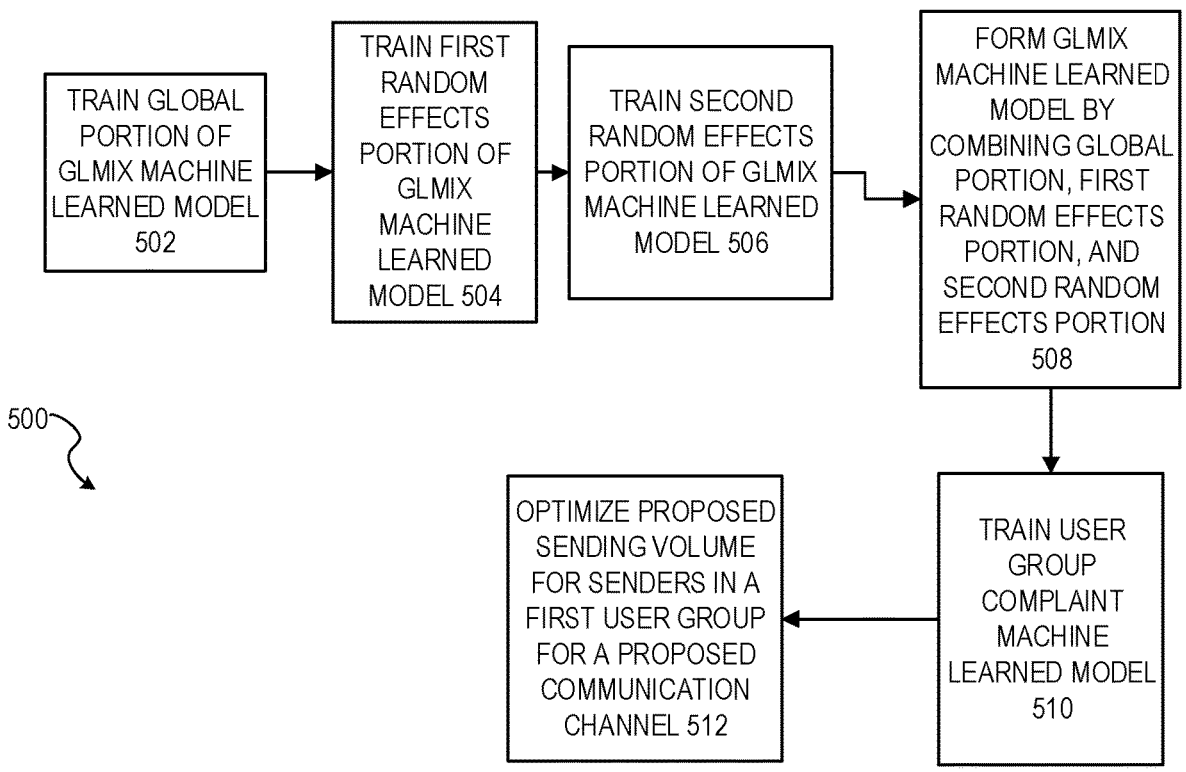
FIG. 5 is a flow diagram illustrating a method for training and using machine learned models in accordance with an example embodiment.

FIG. 5 is a flow diagram illustrating a method 500 for training and using machine learned models in accordance with an example embodiment. At operation 502, a global portion of a GLMix machine learned model is trained by passing sample user group feature data and sample volume data through a first machine learning algorithm to learn one or more coefficients to be applied to user group feature data and volume feature data. The sample user group feature data includes feature data of a plurality of users in each of one or more user groups. The sample volume data includes information on a number of communications sent to users in the one or more user groups within a set period, the communications sent via one or more communication channel.

At operation 504, a first random effects portion of the GLMix machine learned model is trained by passing the sample user group feature data but not the sample volume data through a second machine learning algorithm to learn one or more coefficients to be applied to user group feature data. At operation 506, a second random effects portion of the GLMix machine learned model is trained by passing the sample volume data but not the sample user group feature data through a third machine learning algorithm to learn one or more coefficients to be applied to volume feature data. In some example embodiments, the first, second, and third machine learning algorithms are all the same algorithm, such as a logistic regression algorithm.

At operation 508, a GLMix machine learned model is formed by combining the global portion, the first random effects portion, and the second random effects portion. The GLMix machine learned model produces a prediction, when passed through a first user group, a proposed communication channel, and a proposed communication volume, of a likelihood of a response from a user in the first user group if presented with communications according to the proposed communication volume via the proposed communication channel.

At operation 510, a user group complaint machine learned model is trained by passing the sample user group feature data and sample user group complaint feature data into a fourth machine learning algorithm to learn one or more coefficients to be applied to user group feature data to predict a likelihood of whether a user in a particular user group will complain if presented with communications via a communication channel.

At operation 512, the proposed sending volume for users in the first user group is optimized for the proposed communication channel by maximizing the predicted likelihood output by the GLMix machine learned model while minimizing the predicted likelihood output by the user group complaint machine learned model.

It should be noted that the user response being predicted by the GLMix (and thus also optimized for) may be any positive interaction with a communication about a job opening, such as clicking, sharing, saving, commenting on, etc., the communication. In such a case, the optimization may be performed using convex optimization. Alternatively, the specific response being predicted for may be application of the user to a job opening associated with the communication, in which case the optimization may be performed using non-convex optimization.

Figure 6:
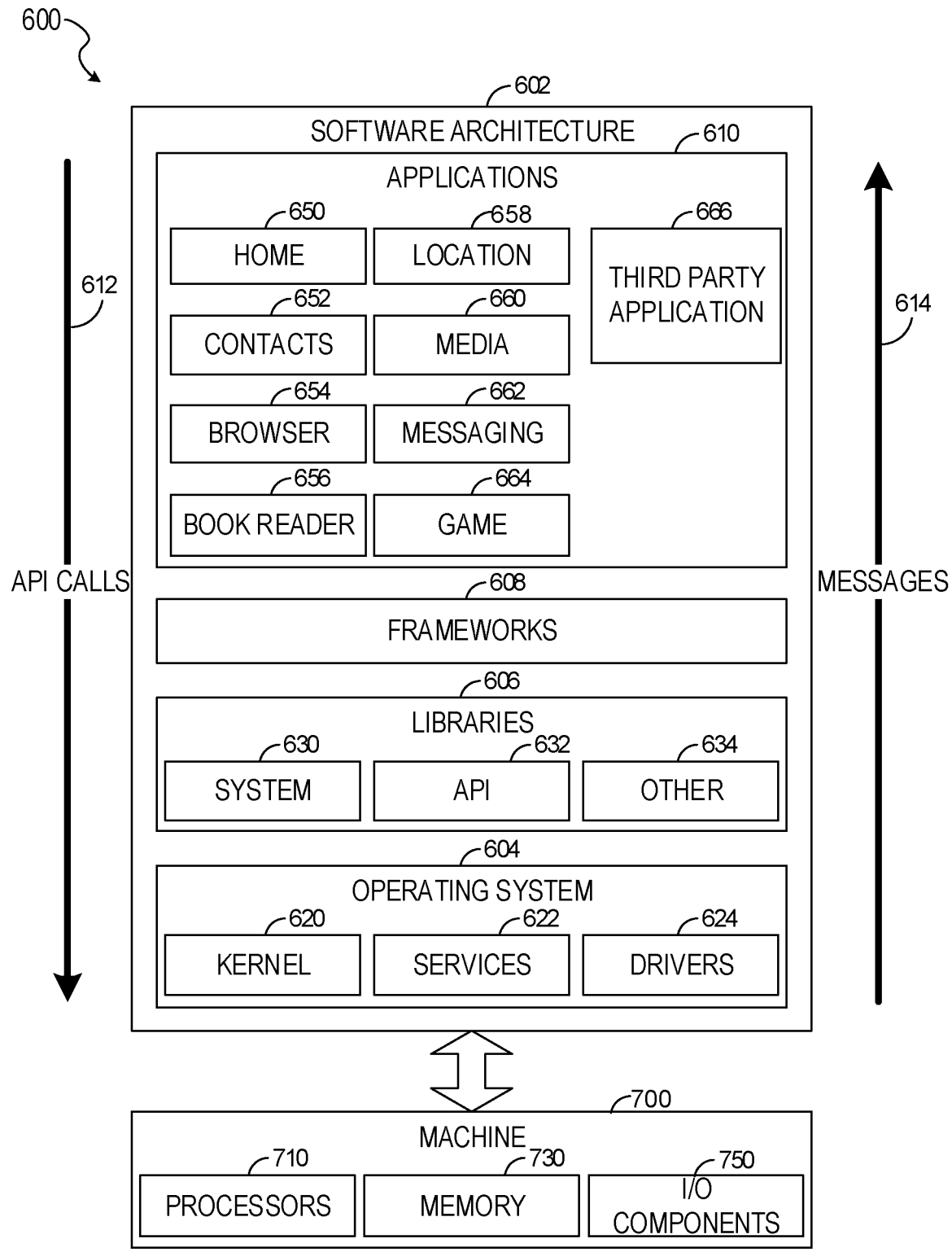
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
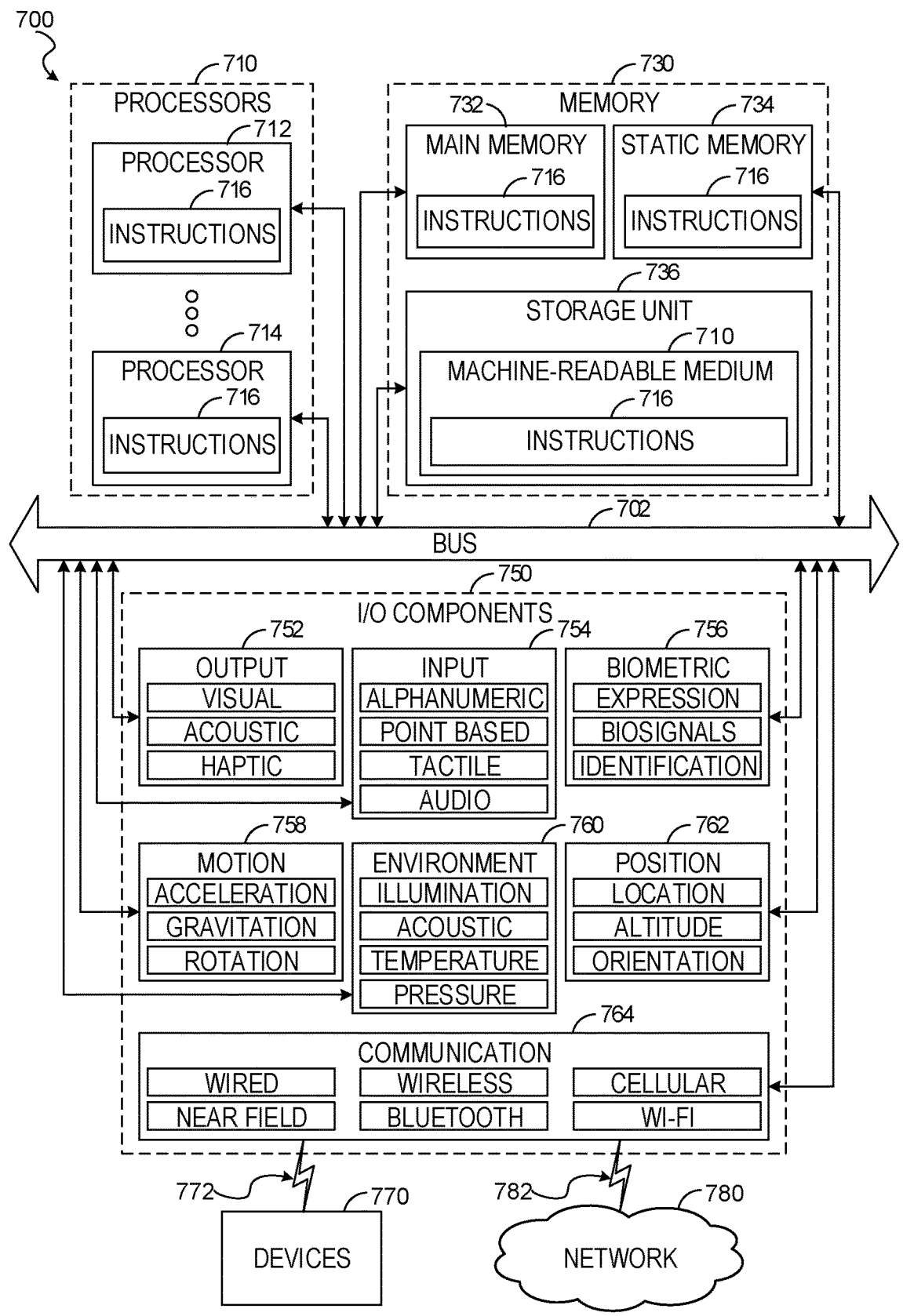
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a computer-readable storage device having instructions stored thereon, which, when executed by a processor, cause the system to perform operations comprising:
   training a generalized linear mixed effect (GLMix) machine learned model by:
   training a global portion of the GLMix machine learned model by passing sample user group feature data and sample volume data through a first machine learning algorithm to learn one or more coefficients to be applied to user group feature data and volume feature data, the sample user group feature data including feature data of a plurality of users in each of one or more user groups, the sample volume data including information on a number of communications sent to users in the one or more user groups within a set period, the communications sent via one or more communication channels;
   training a first random effects portion of the GLMix machine learned model by passing the sample user group feature data but not the sample volume data through a second machine learning algorithm to learn one or more coefficients to be applied to user group feature data;
   training a second random effects portion of the GLMix machine learned model by passing the sample volume data but not the sample user group feature data through a third machine learning algorithm to learn one or more coefficients to be applied to volume feature data;
   forming the GLMix machine learned model by combining the global portion, the first random effects portion, and the second random effects portion, the GLMix machine learned model producing a prediction, when passed a first user group, a proposed communication channel, and a proposed communication volume, of a likelihood of a response from a user in the first user group if presented with communications according to the proposed communication volume via the proposed communication channel.

2. The system of claim 1, wherein the operations further comprise:
   training a user group complaint machine learned model by passing the sample user group feature data and sample user group complaint feature data into a fourth machine learning algorithm to learn one or more coefficients to be applied to user group feature data to predict a likelihood of whether a user in a particular user group will complain if presented with communications via a communication channel; and
   optimizing the proposed communication volume for users in the first user group for the proposed communication channel by maximizing a predicted likelihood output by the GLMix machine learned model while minimizing a predicted likelihood output by the user group complaint machine learned model.

3. The system of claim 2, wherein the communications are communications regarding job openings.

4. The system of claim 3, wherein the response from a user is any positive graphical user interface interaction with a communication and the optimizing is performed using convex optimization.

5. The system of claim 3, wherein the response from a user is an application, via interaction with a graphical user interface, by the user to a job associated with a job opening referenced in the communications, and the optimizing is performed using non-convex optimization.

6. The system of claim 1, wherein the sample user group feature data includes data from user profiles.

7. The system of claim 1, wherein the sample user group feature data includes data about user engagement, via a graphical user interface, with an online network.

8. The system of claim 1, wherein the sample user group feature data includes information on communication channels with which users have received communications and how many of these communications the users have interacted with via a graphical user interface.

9. The system of claim 1, wherein the training the global portion of the GLMix machine learned model is performed by additionally passing sample job action response data through the first machine learning algorithm.

10. The system of claim 9, wherein the sample job action response data includes information about how many interactions, with a graphical user interface, each of a plurality of users has performed on communications within a set period.

11. The system of claim 9, wherein the sample job action response data includes information about how many applications, to a job with a graphical user interface, each of a plurality of users has performed in response to communications within a set period.

12. The system of claim 1, wherein the first, second, and third machine learning algorithms are the same machine learning algorithm.

13. The system of claim 12, wherein the first, second, and third machine learning algorithms are logistic regression algorithms.

14. A computerized method comprising:
training a generalized linear mixed effect (GLMix) machine learned model by:
training a global portion of the GLMix machine learned model by passing sample user group feature data and sample volume data through a first machine learning algorithm to learn one or more coefficients to be applied to user group feature data and volume feature data, the sample user group feature data including feature data of a plurality of users in each of one or more user groups, the sample volume data including information on a number of communications sent to users in the one or more user groups within a set period, the communications sent via one or more communication channels;
training a first random effects portion of the GLMix machine learned model by passing the sample user group feature data but not the sample volume data through a second machine learning algorithm to learn one or more coefficients to be applied to user group feature data;
training a second random effects portion of the GLMix machine learned model by passing the sample volume data but not the sample user group feature data through a third machine learning algorithm to learn one or more coefficients to be applied to volume feature data;
forming the GLMix machine learned model by combining the global portion, the first random effects portion, and the second random effects portion, the GLMix machine learned model producing a prediction, when passed a first user group, a proposed communication channel, and a proposed communication volume, of a likelihood of a response from a user in the first user group if presented with communications according to the proposed communication volume via the proposed communication channel.

15. The method of claim 14, wherein the operations further comprise:
training a user group complaint machine learned model by passing the sample user group feature data and sample user group complaint feature data into a fourth machine learning algorithm to learn one or more coefficients to be applied to user group feature data to predict a likelihood whether a user in a particular user group will complain if presented with communications via a communication channel; and
optimizing the proposed communication volume for users in the first user group for the proposed communication channel by maximizing a predicted likelihood output by the GLMix machine learned model while minimizing a predicted likelihood output by the user group complaint machine learned model.

16. The method of claim 15, wherein the communications are communications regarding job openings.

17. The method of claim 16, wherein the response from a user is any positive graphical user interface interaction with a communication and the optimizing is performed using convex optimization.

18. The method of claim 16, wherein the response from a user is an application, via interaction with a graphical user interface, by the user to a job associated with a job opening referenced in the communications, and the optimizing is performed using non-convex optimization.

19. The method of claim 14, wherein the sample user group feature data includes data from user profiles.

20. A non-transitory machine-readable storage medium comprising instructions which, when implemented by one or more machines, cause the one or more machines to perform operations comprising:
training a generalized linear mixed effect (GLMix) machine learned model by:
training a global portion of the GLMix machine learned model by passing sample user group feature data and sample volume data through a first machine learning algorithm to learn one or more coefficients to be applied to user group feature data and volume feature data, the sample user group feature data including feature data of a plurality of users in each of one or more user groups, the sample volume data including information on a number of communications sent to users in the one or more user groups within a set period, the communications sent via one or more communication channels;
training a first random effects portion of the GLMix machine learned model by passing the sample user group feature data but not the sample volume data through a second machine learning algorithm to learn one or more coefficients to be applied to user group feature data;
training a second random effects portion of the GLMix machine learned model by passing the sample volume data but not the sample user group feature data through a third machine learning algorithm to learn one or more coefficients to be applied to volume feature data;
forming the GLMix machine learned model by combining the global portion, the first random effects portion, and the second random effects portion, the GLMix machine learned model producing a prediction, when passed a first user group, a proposed communication channel, and a proposed communication volume, of a likelihood of a response from a user in the first user group if presented with communications according to the proposed communication volume via the proposed communication channel.

\* \* \* \* \*